United States Patent [19]

Karstens et al.

[11] Patent Number: 5,883,025
[45] Date of Patent: Mar. 16, 1999

[54] MOLDED BODIES COMPRISING BOND MATERIAL BASED ON CELLULOSE ACETATE AND REINFORCING NATURAL CELLULOSE FIBERS, A PROCESS FOR THE PRODUCTION AND THE USE THEREOF

[75] Inventors: Ties Karstens, Botzingen; Joachim Schatzle, Kenzingen; Robert Kohler, Mossingen; Michael Wedler; Martin Tubach, both of Reutlingen, all of Germany

[73] Assignee: Rhone-Poulenc Rhodia Aktinegesellschaft, Freiburg, Germany

[21] Appl. No.: 765,771
[22] PCT Filed: May 14, 1996
[86] PCT No.: PCT/EP96/02074
 § 371 Date: Feb. 19, 1997
 § 102(e) Date: Feb. 19, 1997
[87] PCT Pub. No.: WO96/36666
 PCT Pub. Date: Nov. 21, 1996

[30] Foreign Application Priority Data

May 15, 1995 [DE] Germany .................. 195 17 763.0

[51] Int. Cl.⁶ ................................................ D04H 1/00
[52] U.S. Cl. ................ 442/344; 162/157.6; 162/218; 162/223; 264/109; 264/112; 428/903; 442/334; 442/340
[58] Field of Search .................... 264/109, 112; 162/157.6, 218, 223; 442/334, 340, 344; 428/903

[56] References Cited

FOREIGN PATENT DOCUMENTS

| 0551125 | 7/1993 | European Pat. Off. . |
| 687711 | 12/1995 | European Pat. Off. . |
| 519822 | 6/1921 | France . |

OTHER PUBLICATIONS

Chemische Rundschau, Asche W. "AVK–Tagung Faserverstarkte Kunstoffe—Weg Zurück Zurnatur" 30 Sep. 1984.

*Primary Examiner*—James J. Bell
*Attorney, Agent, or Firm*—Bucknam and Archer

[57] ABSTRACT

Described are molded bodies comprising bond material based on cellulose acetate as a bonding agent and reinforcing natural cellulose fibers or natural cellulose-containing fibers. These components are characterized by the fact that the cellulose acetate has a degree of substitution (DS) of approximately 1.2 to 2.7 and the molded bodies have a Vicat temperature of at least approximately 160° C. and the ratio of the weight of cellulose acetate to the natural cellulose fibers or natural cellulose-containing fibers is approximately 10:90–90:10. These molded bodies are produced by mixing cellulose acetate with the natural cellulose fibers or the natural cellulose-containing fibers in a ratio by weight of approximately 90:10–10:90, in particular 15:85–85:15, in the total moisture content is adjusted to at least approximately 3% by weight, with respect to the total amount of the cellulose acetate in the mixture, and this mixture is molded at a temperature of approximately 220° to 280° C. and a pressure of approximately 30 to 150 bars. The molded bodies according to the invention can advantageously be used as interior parts of automobiles, in particular as roof ceiling and as side paneling, as well as packaging material, insulating material or as a furniture part.

17 Claims, 1 Drawing Sheet

MOLDED BODIES COMPRISING BOND MATERIAL BASED ON CELLULOSE ACETATE AND REINFORCING NATURAL CELLULOSE FIBERS, A PROCESS FOR THE PRODUCTION AND THE USE THEREOF

FIELD OF THE INVENTION

The invention relates to molded bodies comprising bond material based on cellulose acetate as bonding means and reinforcing natural cellulose fibers, respectively, natural cellulose-containing fibers, a process for the production of the molded bodies as well as the use in special technical fields.

BACKGROUND OF THE PRIOR ART

Apart from synthetic materials from thermoplastic or thermosetting polymers, in many fields, for example in the automotive, packaging, furniture, electric and electronics industry as well as in the field of construction and the like, occasionally synthetic materials from thermoplastic or duroplastic polymers from polymers containing fiber structures or polymers containing fibers or fiber-reinforced polymers are used. Such materials are frequently produced as semi-finished products, for example in the form of web materials, matting, boards etc. These are used immediately or only after further processing or refining and finishing, for example by molding, coating or the like. In addition to fiber materials, or instead of fiber materials, these polymeric materials may comprise suitable fillers to lend them specific properties. The variety and the number of options of applications of these bond materials comprising a great variety of polymers, fibers and fillers is almost unlimited.

Within the scope of increased environmental awareness and restrictive laws, the ability for recycling of materials or their environmentally harmless disposal plays an increasingly more important role. In particular, the ecologically compatible waste disposal assumes increasingly critical significance since the recyclability is limited due to growing contamination and material damages and in this case the elimination becomes unavoidable. This may be carried out by combustion or forming deposits. An unlimited formation of deposits may be made in public locations. The perpetual waste disposal unlimited in time is not possible for reasons of space. A particularly simple and advantageous form of elimination is the biological degradation which can occur, for example, through composting. If the expression "biologically degradable" herein-below is used, it is intended to be understood that the corresponding substance is accessible to degradation through living organisms (organisms/ microorganisms) and/or through natural environmental factors, for example the chemical degradation through bacteria, fungi, in particular molds and yeasts. Synthetic materials which are commonly used in packaging materials, in particular polystyrene, are not biologically degradable. In the case of carbohydrates the biological degradation, for example primarily in the form of anaerobic bacterials decomposition, leads to harmless lower fatty acids, alcohol and carbon dioxide. This is referred to by the term "rot". Intermediate products of the rotting processes can combine to form harmless new polymeric products and this advantageous humification is utilized in composting. This process involves in particular the biological degradation or the conversion of organic substances, in particular organic wastes, wood, leaves, and other plant materials, paper and sewage sludge, which proceeds with the development of heat ("spontaneous heating") and leads to the formation of compost, a dark, crumbly substance with advantageous components of nutrient salts (phosphate, nitrogen and potassium compounds) (see Rompp Chemie-Lexikon, 9th Edition, Vol. 3, 1990, pp. 2312/2313).

In view of the mentioned possibilities of subjecting specific waste materials to biological degradation, natural products are increasingly therefore of interest in material development. They offer many advantages. As regenerated raw materials they contribute to the protection of resources. They are further largely nontoxic and can be combusted without leaving residues. Their degradation products are compatible with environmental protection.

Materials of wood chips or natural fibers, such as cellulose, cotton, bast fibers and wool have been processed for a long time into known products, such as paper, cardboard, felts, fiber boards and particle board. These wood chips or natural fibers can also serve for the manufacture of preforms (molded bodies) according to different processes. There is also a a great number of new developments in which high-strength natural fibers such as flax, hemp, ramie and the like, whose mechanical properties are to some extent comparable to those of synthetic high-performance fibers, are used as reinforcing fibers in bond or composite materials. The old and the new materials have in common the feature that they must comprise a synthetic polymer or synthetic polymers as bonding agents to achieve strength, stiffness, good molding properties or durability. However if biological degradability is required, only natural bonding agents such as starch, rubbers etc. can be considered. However, there is the disadvantage that they are soluble in water.

The development of replacing synthetic, biologically non-degradable polymers in the bond materials by biodegradable polymers has not yet been concluded. Natural products, such as cellulose, starch etc. as directly moldable substances are not suitable for most purposes or are inferior to synthetic polymers with respect to variability of properties and processing. Biodegradable novel polymers suitable for composites are, for example, the polyhydroxy butyrates, but these are very expensive.

In bond and composite materials the mixing ratio of bonding means components and reinforcement or filler components can fluctuate within wide limits. The portion of the polymer bonding means depends only on the properties required for the particular applications. For insulating materials or specific packaging materials, for example relatively soft web materials or specific packaging materials, for example soft web materials with low amounts of polymer bonding means are suitable. However also hard and stiff fiber boards can be produced with low mixtures of bonding means. On the other hand, for viscoplastic and waterproof materials and materials suitable for thermoforming, higher amounts of polymers are necessary. If in the final analysis the material properties are to be largely determined by the polymer, potentially only small additions—only for purposes of modification—of filler or reinforcement materials are necessary.

Moldable semifinished products, for example, for automobile parts, such as paneling, for example door paneling, roof ceiling and the like, are currently produced in large quantities with resin-bonded fiber matting comprising glass fibers, wood fibers, reprocessed cotton or bast fibers. Phenolic resins are predominantly used as the polymer. However, this is controversial from a toxicological and ecological point of view. Therefore, increasingly also other thermosetting materials, such as epoxides or unsaturated polyesters, are being used. Thermosetting bonding agents offer the advantage that they do not tend to become deformed at the temperatures in cars, which to some extent can be extreme. However, there are the drawbacks in the use of thermosetting bonding agents that the processing is complex and the price is high. In particular, epoxides, for example, are relatively expensive. A further drawback is that cured thermosetting materials can only be recycled with difficulty. For these reasons, other fiber-reinforced thermoplastic polymers, most often polypropylene, are currently used to a large extent. However, these polymers have low thermal dimensional stability. As an alternative to glass fibers natural fibers, such as cellulose are used or jute, but also wood powder. The materials for molded bodies known so far, comprise as a rule at least 20% by weight of polymers. Due to this relatively high amount of polymer the fibers are enveloped and bonded in such a manner that their biodegradability is no longer possible.

As insulating material for the thermal insulation of buildings there are used in large quantities glass fibers or mineral fiber matting which are bonded with low amounts of thermosetting materials, such as phenolic or urea resins. Due to toxicological considerations against the use of mineral fibers and their uncertain disposal, natural fiber matting is being increasingly developed and offered for sale. Depending on the production process, these fibers must also be strengthened with suitable polymer bonding agents. For example, for thermal strengthening, readily melting, synthetic bonding fibers are being used. However, these fibers conflict with the demand for biological degradability.

Various publications, for example "Verpackung aus nachwachsenden Rohstoffen (Packaging of regenerated raw materials)", Vogel Buchverlag, Wurzburg, 1st Edition, 1994, pp 146–148 as well as 374–380, "Nachwachsende und biobbaubare Materialien im Verpackungsbereich (Regenerated and biodegradable materials in the packaging field)", Roman Kovar Verlag, München, 1st Edition, 1993, pp. 120–126 as well as 463 and DE 39 14 022 A1, describe a raw material which is readily biologically degradable by composting and which is based on cellulose acetate and citric acid esters and its use for the production, for example of wrappings or containers for oil lights, eternal oil candles, composition oil lights, other light implementations for graves and foils. In addition to the specified materials, this synthetic material comprises polyesters and if necessary other organic acids and/or acid esters. The citric ester serves as softener and results in the capability of the cellulose acetate to be processed thermoplastically so that it can be formed into a molded body.

The article "AVK-Tagung Faserverstarkete Kunststoffe Weg zuruck zur Natur" (AVK Conference Fiber Reinforced Synthetic Materials—the path back to nature), by Wolfgang Asche in the Journal "Chemische Rundschau", No. 39, 30 September 1994, p. 3, describes the use of the above mentioned synthetic material, described inter alia in the cited publication "Verpackung aus nachwachsenden Rohstoffen", based on cellulose diacetate and citric acid esters together with natural fibers, such as ramie, flax, sisal or hemp, for the production of composite materials. The described moldable material based on cellulose diacetate, citric acid esters and polyesters and if necessary other organic acids and/or acid esters as well as natural fibers, ramie, flax, sisal or hemp can be processed into molded bodies which can be readily degraded biologically. Because of the high prices of the synthetic material, they are relatively expensive. A drawback in particular is the portion of citric acid ester as softener. During the processing of these materials this softener can escape at high temperatures which can lead to undesirable vapors or smoke loads. The softener can also migrate at normal temperatures to the surface of the material and can evaporate impairing the environment. Due to the incorporation of the low-molecular softener the finished product also experiences a loss of strength. It has further a rather low softening point, which is due to the softener.

United States Patent; U.S. Pat. No. 3 271 231 relates to a flexible fiber web free of support comprising cellulose acetate fibers and cellulose fibers. By necessity, in its production a softener is used in the amount of 2 to 8% by weight. This patent shows that the cellulose acetate is not completely plastified but rather is only softened and bonds the cellulose fibers at their points of contact. In this manner flexible molded sheet objects with an open structure are obtained.

The known processes for the production of molded bodies based on cellulose acetate and reinforcing natural cellulose fibers as well as the molded bodies produced accordingly require absolutely the presence of softeners. However, this is a drawback from a number of points of view. The softener leads, for example, to a lower thermal stability under load, as a measure of which, for example, the Vicat temperature can be used. The thermal stability under load of the known materials is insufficient for applications, for example, in the automobile industry, where markedly higher Vicat temperatures are desired. On the other hand, the use of softeners in the thermal molding of cellulose acetate has been considered among experts to be absolutely necessary. Pure cellulose acetates can hardly be melted without degradation since their softening is always accompanied by thermal degradation. For example, the monograph "Cellulose and Cellulose Derivatives", Vol. V, Part 3, Emil Ott, H. M. Spurlin explains on page 1364: ". . . softening and degradation of 2.5 cellulose acetate is in the range of 235° C. to 270° C. . . . ". One skilled in the art must thus assume that during the thermal shaping of cellulose acetates, softeners are always required.

SUMMARY OF THE INVENTION

The invention addresses the problem of further developing the molded bodies described above in such a manner that they do not have the physical drawbacks of the known molded bodies, can be biologically degraded without any problems and exhibit the desirable mechanical properties, such as in particular strength and thermal stability and also meet the strict operational requirements. In particular at relatively high temperatures they should not lead to vapors or smoke loads and should eliminate the need of including a softener.

According to the invention this problem is solved because the cellulose acetate has a degree of substitution (DS) of approximately 1.2 to 2.7, the molded body has a Vicat temperature of at least 160° C. and the ratio of weight of cellulose acetate to the natural cellulose fibers or the natural cellulose-containing fibers is about 10:90–90:10.

Within the scope of the invention by the term "molded bodies" is to be understood in particular rigid molded bodies, preferably with a smooth surface. The cellulose acetate used as bonding agent forms preferably a matrix in which the reinforcing fibers, apart from the visible surfaces and cut edges, are essentially completely embedded.

The invention resides in particular on the finding that when specific process conditions are maintained with respect to the degree of substitution of the cellulose acetate, content of moisture, temperature and pressure, a mixture of cellulose acetate with natural cellulose fibers or natural cellulose-containing fibers can be processed into molded bodies without adding external softeners. The conditions will be explained hereinbelow in more detail in connection with the process according to the invention.

It is assumed that the water present in the starting material due to the minimum moisture content acts as a "temporary softener". During the production process the water escapes to a great extent so that the softening action is subsequently cancelled. In particular by omitting completely or to a great extent external softeners, according to the invention, molded bodies are obtained with high Vicat temperatures which previously could not be attained. Also the modulus of elasticity in tension, the flexural strength and the modulus of flexure are favorably affected. The addition of small quantities of conventional softeners is basically, not excluded within the scope of the invention as long as the molded bodies being produced have a Vicat temperature of at least 160° C.

The molded bodies according to the invention comprise cellulose acetate as the bonding agent. Cellulose acetate has been known for a long time and on an industrial scale is largely used for the production of fiber-form materials that are filaments and spinnable fibers as well as for the production of foils/films. Fiber-form cellulose acetate is utilized in large quantities for the production of cigarette filters and in small quantities for textiles. It is also known, as shown above, that cellulose acetate is biologically degradable and its biological degradation can be accelerated if its acetyl number is decreased. As material for the production of composite material pure cellulose acetate has not been used so far since it has been assumed that it has the serious disadvantage that it cannot be processed thermoplastically and during further processing yields products with undesirable properties. It must therefore be viewed as extremely surprising that within the scope of the invention pure cellulose acetate, without requiring to include additionally a softener with the resulting disadvantages, can be processed thermoplastically. With respect to its degree of substitution (DS) specific conditions must be observed. It has been found, that the degree of substitution should be less than 3, namely in the range of approximately 1.2 to 2.7. A degree of substitution (DS) between approximately 1.8 and 2.5 is preferred. If the degree of substitution (DS) is higher than 2.7 massive impairment of the thermoplastic processability occurs. A degree of substitution (DS) below 1.2 means that the molded bodies can absorb moisture to a high degree and in this case they are no longer dimensionally stable.

The degree of polymerization (DP) of the cellulose acetate is preferably between approximately 140 and 270, in particular between approximately 170 and 250. If the degree of polymerization (DP) is between approximately 140 and 270, especially advantageous properties are obtained such as, in particular, high mechanical strength with simultaneously good processability during molding.

Further important components of the molded bodies according to the invention are the reinforcing natural cellulose fibers or the natural cellulose-containing fibers which, in terms of the definition explained above are to be understood as "biologically degradable". In individual cases one can also speak of an extensive biological degradation which should as much as possible lead to such degradation products which can be considered not to be damaging to the environment. According to the invention, natural cellulose fibers or natural cellulose-containing fibers are used with special advantage in the form of capoc, sisal, jute, flax, coconut, gambo, abaca, mulberry bast, hemp, ramie and/or cotton fibers. The fibers have preferably a mean fiber length of approximately 0.2 to 100 mm, in particular 3 to 30 mm, and a mean cross-sectional diameter of approximately 8 to 100 $\mu$m, in particular approximately 10 to 30 $\mu$m.

The ratio of the weight of cellulose acetate to the reinforcing natural cellulose fibers or natural cellulose-containing fibers is not critical. It is between approximately 10:90 and 90:10, in particular between approximately 15:85 and 85:15 and, especially preferred, between approximately 25:75 and 60:40.

Due to the process for the production of the molded bodies according to the invention, which will be described hereinbelow in further detail, these bodies achieve the requisite thermal stability for which the so-called Vicat temperature is a suitable method. It is determined according to DIN 53 460 (December 1976). The temperature is determined according to this method by means of a steel pin with a circular cross section of 1 mm$^2$ and a length of at least 3 mm which penetrates with a force of 50N 1 mm deep vertically into a sample body. Heating at a heating rate of 120 K/min takes place. The Vicat temperature for most polymers is markedly below the temperature at which the polymer is completely converted to the liquid state. Within the scope of the invention it is at least approximately 160° C., preferably at least approximately 170° C. and in particular approximately 180° to 200° C.

It can be advantageous to incorporate into the molded bodies according to the invention additionally mineral materials to improve the mechanical properties. These materials are not biologically degradable but are at least inert and ecologically not harmful. Preferred examples of these mineral materials are calcium carbonate, calcium sulfate, silicon dioxide and aluminosilicates, such as for example kaolin. The mineral material is present advantageously in the molded bodies in amounts of approximately 5–50% by weight, in particular approximately 10–20% by weight. Apart from these mineral materials, the molded bodies according to the invention can also contain coloring agents in the form of dyes and/or in particular colored pigments. If the molded bodies according to the invention are to be dyed white, a white pigment in the form of titanium dioxide is preferred. Additional conceivable colored pigments are for example iron oxides. In order to achieve the desired coloring, 0.2 to 1% by weight of the coloring agent in the molded body according to the invention is sufficient.

There may be incorporated into the molded bodies according to the invention additional substances for modification, for improving processibility and to attain specific material properties, if the biological degradability and the ecological safety are not significantly restricted. Typical possible auxiliary agents and additives are lubricants, adhesives, hydrophobic or hydrophilic agents, flame protectants, biocides, rodenticides, aromas and the like. In addition, it is also possible to include natural and biologically degradable fillers which accumulate in the processing or reprocessing of textile cuttings of natural fibers, reprocessed wool and reprocessed cotton as well as scraps of waste paper and the like.

The molded bodies according to the invention are produced in conjunction with the process according to the invention described hereinbelow in which the starting materials are processed into a bond material in which the cellulose acetate fraction fulfills the function of the bonding agent and forms a largely fused phase.

For the production of the molded bodies according to the invention the process is such that cellulose acetate is mixed with the natural cellulose fibers or the natural cellulose-containing fibers in a ratio of weight of approximately 10:90 up to 90:10, the total moisture content is adjusted to at least approximately 3% by weight relative to the total quantity of the cellulose acetate in the mixture, and the mixture is molded at a temperature of approximately 220°–280° C. and a pressure of approximately 30–150 bars. The ratio of the weight of cellulose acetate to the natural cellulose fibers or the natural cellulose-containing fibers mentioned above is approximately 15:85–85:15 and especially 25:75–60:40. If the ratio falls below the lower limit value of 10:90, the amount of cellulose acetate is not sufficient to hold the cellulose fibers sufficiently tight in the composite. If the upper limit value of approximately 90:10 is exceeded, the desired reinforcing function of the cellulose fibers is to a great extent lost.

The starting materials are preferably mixed at ambient temperature and subsequently subjected to the above process conditions. The molding takes place preferably at a temperature of approximately 240°–270° C. and a pressure of approximately 50–130 bars. Adherence to the pressure range of approximately 30–150 bars is essential to the invention and can be explained as follows: a pressure below approximately 30 bars leads to the result that cellulose acetate cannot flow sufficiently well and thus is not present homogeneously in the molded body, while exceeding the pressure of approximately 150 bars is of disadvantage because this would require very high technical expenditures. In order to fuse the cellulose acetate sufficiently, it is required that during the molding under pressure, a minimum temperature of approximately 220° C. be reached. If the upper limit of 280° C. is exceeded, the result is that the cellulose acetate is being thermally damaged.

The cellulose acetate can be mixed with the particular reinforcement components or other additives in any form. Fundamentally, all corresponding forms of use known and tested in other fields, can be used. Suitable forms of use are for example, powder, ground bulk or granulate, but in particular also fibers of different lengths and cross sections or also ribbons of a film of cellulose acetate. It is also possible to use bonding agents in the form of flat structures such as foils or films or fiber webs. Finally, in individual cases the bonding agent can also be introduced out from a liquid phase, from solutions or dispersions.

To mix the mentioned starting materials of the molded body according to the invention, all known processes of composite production are in principle suitable. Due to the special properties of the composite components, some mixing processes are especially preferred. Thus, the conventional processes of polymer compounding are possible, such as for example with extruders, strainers, kneaders or roll mills. Since thermal and mechanical loading of the components of the bond materials can already occur before the molding, mixing methods in which the cellulose acetate acting as bonding agent is not significantly thermally affected, are particularly advantageous.

For the production of preforms or for the production of profiles with specific properties, the impregnation with solutions or dispersions or also the joining of the components in sheet form as films and/or fiber web by lamination or according to sandwich or film-stacking processes are especially well suited. Especially advantageous, in view of the possible material properties according to the invention, is the addition of the cellulose acetate to the particular reinforcement material in the form of powders or fibers, for example by mixing and dispersion processes in fiber mixing stations or within the scope of one of the various web forming processes. The mechanical web formation on carding machines or carders, the aerodynamic web formation and the hydrodynamic web formation or the paper process are particularly suitable.

Starting materials with different properties are available after the mixing process depending on the mixing process applied. For example with compounding on extruders or in film stacking processes, hard and solid products are obtained. These can in every case be granulated for further processing or can also be formed directly into boards, profiles or finished parts. Through fiber mixing or with web forming processes, depending on the method, loose or solid matting is obtained which can in every case already be used as such, for example for insulating purposes or as a semi-finished product, or they can subsequently be further processed to yield the desired products. Apart from the biological degradability, a significant advantageous property of the molded bodies according to the invention is the fact that they indeed, in principle, comprise thermoplastics and also have advantages which can be traced back to them, but the thermoplasticity is only given under special processing conditions. On the contrary, the products under usual conditions in use exhibit practically no thermoplastic behavior and consequently have excellent thermal stability under load.

The bond materials according to the invention under specific processing conditions have the necessary good molding properties, in particular the molding temperatures and the molding pressure must be adapted to the particular requirements of the composition. Of course, during the processing the material moisture is also of relevance. For example, the total moisture content of the starting material must be at least approximately 3% by weight with respect to the total amount of the cellulose acetate used in the starting mixture. This amount can be potentially approximately 20% by weight and regularly especially good values in the range of approximately 3–5% by weight are obtained. In general, the natural cellulose fibers or the natural cellulose-containing fibers have already the necessary moisture content in order to meet during the mixing the above requirements of the total moisture content. For example, under conditions of normal climate, according to DIN 50 014, 20° C., 65% ambient humidity flax contains 8–10% water.

The cellulose acetate also contains as a function of the degree of substitution and the particular climate conditions, a specific equilibrium moisture content. A desired total moisture content can be achieved by conditioning the starting materials, preferably already in the mixed form, for example as fiber web, in a climate chamber with suitable temperature and ambient humidity. Alternatively, for example fiber webs can be brought to a desired moisture content before the molding by spraying them with water.

As is readily apparent, the molded bodies according to the invention due to their special thermal and mechanical properties can be used to advantage in a variety of applications. This applies in particular to the field of automobiles, for example, as side paneling or door paneling as well as roof ceiling, as packaging material insulating material or as furniture parts. Of significance are the molded bodies according to the invention also as semifinished products of any type, such as web materials, matting, boards/sheets and foils/films.

The invention will be explained in conjunction with several examples and reference is made to Tables 1 to 3 with respect to features essential to the invention.

BRIEF DESCRIPTION OF THE DRAWING

The figure shows the plotting of the profiles of Tan δ over the Temperature for comparative examples 1 and 2 and Example 12.

EXAMPLES 1 to 10

Figure 1:
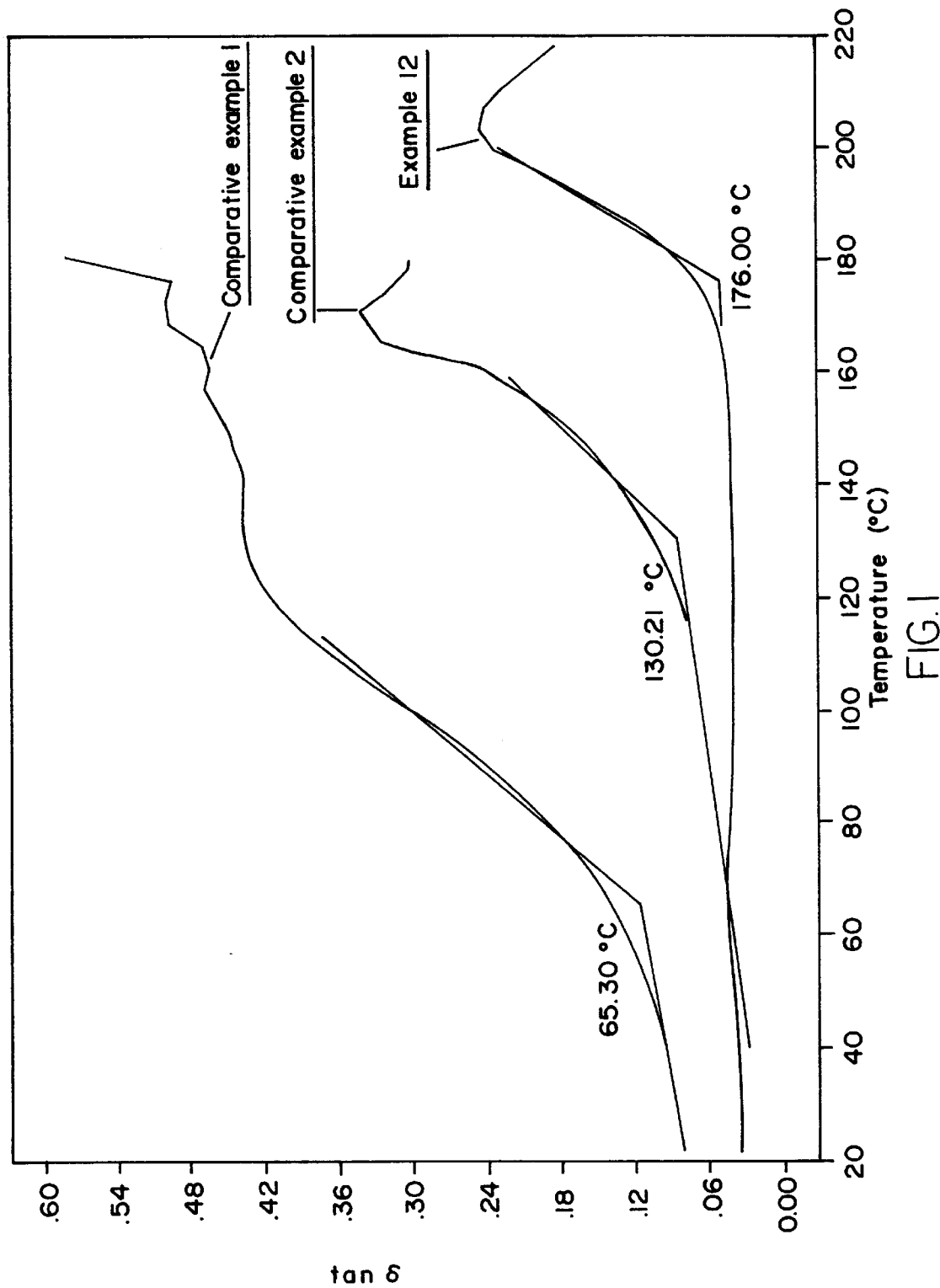

Cellulose acetate fibers having the DS values shown in Table 1 and the fiber amount also there stated were used. Flax fibers of a cut length of 10 mm and cellulose acetate fibers of a cut length of 5 mm and a gauge of 3 dtex were processed to fiber web in a wet-web facility. Two types of cellulose acetate were used which differed in the degree of substitution (DS): DS 2.2 (Examples 1 to 5) and DS 2.5 (Examples 6 to 10). The amount of flax fibers varies from 15 to 85% by weight. These webs were molded in multiple layers in a hydraulic press to form boards of approximately 2.5 mm thickness. The pressing conditions were 260° C., 1 minute and 120 bars. The webs were conditioned to a total moisture content of approximately 4% by weight before the molding. The mechanical properties are listed in Table 1.

EXAMPLES 11 to 15

Cellulose acetate fibers having the DS value and the fiber amount listed in Table 2 were used. All press boards had a fiber amount of 50% by weight. With respect to the mechanical properties of the molded bodies obtained accordingly, reference is also made to Table 2.

Example 13 corresponded to example 8, but the web was not produced on a wet installation but rather a web carding machine was used with fiber length of flax and cellulose acetate: 50mm.

Examples 14 and 15 corresponded to example 8 and jute and paper fibers (CTMP), instead of flax, were worked in.

Comparative Examples 1 and 2

For comparison of the material, cellulose acetate press board with Bioceta was produced with cellulose acetate capable of extrusion casting, with high softener fraction, production on wet-web installation and 50% flax as well as polypropylene, with production according to the "film stacking" process in which a sandwich construction with several layers of flax web and PP film was molded. The flax fraction was 50% by weight. The mechanical data is given in Table 2. The measured Vicat temperature is a measure of the thermal stability under load.

EXAMPLES 16 to 18

Cellulose acetate fibers having the DS values and the fiber amount listed in Table 3 were used. Press boards of pure cellulose acetate in Example 16 as well as press boards with 50 and 75% by weight of flax according to Examples 17 and 18 were buried for 45 days and at 29° C. in moist soil in accordance with the soil burial test according to DIN 53 933. The changes of the mechanical properties as well as the loss of weight are listed. By adding flax, the weight loss is increased. This means that the biological degradation proceeds more rapidly.

EXAMPLE 19

The materials of comparative Example 1 (CA Bioceta), comparative Example 2 (polypropylene) and Example 12 according to the invention were subjected to dynamic mechanical thermoanalysis. In this measuring principle a strip-form sample was tightly clamped at one end while the movable other end by means of a motor was caused to vibrate at a frequency of 1 Hz and an amplitude of 30 $\mu$m. The force required for bending the sample was measured and output as tan $\delta$. During the measurement the sample was disposed in a thermal chamber which was heated at a constant heating rate of 2° C./minute. With the softening of the sample, a rise of tan $\delta$ occurred. In FIG. 1 the profiles of tan $\delta$ over the temperature are plotted. Based on these data, the softening temperatures in °C. can be determined, which are listed in Table 4. It is found that the material according to the invention at 176° C. has the highest softening temperature.

The abbreviation CA stands in all tables for cellulose acetate.

TABLE 1

| Example | CA Fiber DS | Fiber Fraction % | Tensile Strength N/mm | Elongation % | Modulus E in Tension N/mm$^2$ | Flexural Strength N/mm$^2$ | Modulus E in Flexure N/mm$^2$ | Impact Strength mJ/mm$^2$ |
|---|---|---|---|---|---|---|---|---|
| 1 | 2.2 | 15 | 27 | 2.8 | 1300 | 54 | 2320 | 4.7 |
| 2 | 2.2 | 25 | 30 | 2.4 | 1800 | 51 | 2600 | 7.0 |
| 3 | 2.2 | 50 | 43 | 2.0 | 3300 | 64 | 4300 | 12.1 |
| 4 | 2.2 | 75 | 52 | 2.1 | 3400 | 63 | 4300 | 18.3 |
| 5 | 2.2 | 85 | 44 | 2.5 | 3300 | 73 | 6700 | 14.8 |
| 6 | 2.5 | 15 | 27 | 2.7 | 1380 | 50 | 2300 | 4.5 |
| 7 | 2.5 | 25 | 30 | 1.9 | 1500 | 50 | 2300 | 6.2 |
| 8 | 2.5 | 50 | 43 | 2.2 | 2800 | 72 | 3800 | 15.8 |
| 9 | 2.5 | 75 | 52 | 2.0 | 3900 | 80 | 5400 | 11.2 |
| 10 | 2.5 | 85 | 44 | 2.0 | 3600 | 70 | 3700 | 12.2 |

TABLE 2

(Fiber of filler fraction 50% by weight)

| | CA Fiber DS | Fiber or Filler | Tensile Strength N/mm$^2$ | Elongation % | Modulus E in Tension N/mm$^2$ | Flexural Strength N/mm$^2$ | Modulus E in Flexure N/mm$^2$ | Impact Strength mJ/mm$^2$ | Vicat °C. |
|---|---|---|---|---|---|---|---|---|---|
| Example | | | | | | | | | |
| 11 | 2.2 | flax | 43 | 2.0 | 3300 | 64 | 4300 | 12.1 | 191 |
| 12 | 2.5 | flax | 45 | 2.2 | 2800 | 72 | 3800 | 15.6 | 195 |
| 13 | 2.5 | flax carding | 31 | 1.4 | 3200 | 87 | 5600 | 14.3 | |
| 14 | 2.5 | jute | 33 | 1.5 | 2700 | 55 | 4650 | 4.8 | |
| 15 | 2.5 | paper | 42 | 2.5 | 2550 | 73 | 3650 | 5.5 | |
| Comparison Examples | | | | | | 64 [SIC] | | | |
| 1 | CA Bioceta | flax | 43 | 2.5 | 2500 | 44 | 3400 | 17.5 | 125 |
| 2 | polypropylene | flax | 52 | 5.5 | 2000 | 82 | 4700 | 36.0 | 130 |

TABLE 3

Burial Test
(Percentage Change of Properties Relative to the Starting Value of 100%
Matrix: Cellulose Acetate With DS = 2.5, Duration of Burial 45 Days)

| Example | Fraction Flax % | Change of Tensile Strength % | Change of Modulus E in Tension % | Change of Elongation at Rupture % | Weight Loss % |
|---|---|---|---|---|---|
| 16 | 0 | 127 | 92.0 | 150 | 0.5 |
| 17 | 50 | 59 | 52.0 | 142 | 7 |
| 18 | 75 | 48 | 39.0 | 150 | 15 |

TABLE 4

DMTA Measurement

| Example | Softening Temperature in °C. |
|---|---|
| Comparative Example 1 | 65 |
| Comparative Example 2 | 130 |
| Example 12 | 176 |

Note:
The various properties were determined according to the following DIN specifications:
Tensile strength: DIN 53 455
Modulus of elasticity in tension: DIN 53 457
Flexural strength: DIN 53 452
Modulus of elasticity in flexure: DIN 53 457
Elongation at rupture: DIN 53 455
Impact strength: DIN 53 453

What is claimed is:

1. A molded body comprising bond material based on cellulose acetate as a bonding agent and reinforcing natural cellulose fibers or natural cellulose-containing fibers, characterized by the fact that the cellulose acetate has a degree of substitution (DS) of approximately 1.2 to 2.7 and the molded body has a Vicat temperature of at least approximately 160° C. and the ratio of weight of cellulose acetate to the natural cellulose fibers or the natural cellulose-containing fibers is approximately 10:90–90:10.

2. The molded body according to claim 1, characterized by the fact the degree of substitution (DS) of the cellulose acetate is between approximately 1.8 to 2.6, in particular between approximately 2.1 and 2.5.

3. The molded body according to claim 1, characterized in that the ratio by weight of cellulose acetate to the natural cellulose fibers or to the natural cellulose-containing fibers is approximately 15:85–85:15, in particular approximately 25:75–60:40.

4. The molded body according to claim 1, characterized in that the Vicat temperature is at least approximately 170° C., in particular approximately 180 to 200° C.

5. The molded body according to claim 1, characterized in that the degree of polymerization (DP) of the cellulose acetate is between approximately 140 and 270, in particular between approximately 170 and 250.

6. The molded body according to claim 1, characterized in that the natural cellulose fibers or the natural cellulose-containing fibers have a mean fiber length of approximately 0.2 mm up to 100 mm, in particular of approximately 3 mm to 30 mm, and a mean cross-sectional diameter of approximately 8 um and 100 um, in particular of approximately 10 $\mu$m to 30 $\mu$m.

7. The molded body according to claim 1, characterized in that the natural cellulose fibers or the natural cellulose-containing fibers are present in the form of capoc, sisal, jute, flax, coconut, gambo, abaca, mulberry bast, hemp, ramie and/or cotton fibers.

8. The molded body according to claim 1, characterized in that it comprises, in addition, mineral materials.

9. The molded body according to claim 8, characterized in that the mineral material is calcium carbonate, calcium sulfate, silicon dioxide and/or aluminosilicate.

10. The molded body according to claim 8, characterized in that the mineral material is present in the amount of approximately 5–50% by weight, in particular approximately 10–20% by weight.

11. The molded body according to claim 1, characterized in that it comprises coloring agents.

12. The molded body according to claim 11, characterized in that the coloring agent is a pigment, in particular a white pigment.

13. The molded body according to claim 11, characterized by the fact that the coloring agent is in the amount of approximately 0.1–1% by weight.

14. A process for the production of the molded body according to claim 1, characterized in that cellulose acetate is mixed with the natural cellulose fibers or the natural cellulose-containing fibers in a ratio of weight of approximately 10:90–90:10, in particular approximately 15:85–85:15, the total moisture content is adjusted to at least approximately 3% by weight of total moisture content is adjusted to at least approximately 3% by weight, with respect to the total amount of the cellulose acetate in the mixture, and this mixture is molded at a temperature of approximately 220° to 280° C. and a pressure of approximately 30 to 150 bars.

15. The process according to claim 14, characterized in that the starting materials are mixed at ambient temperature.

16. The process according to claim 14, characterized by the fact that the molding is carried out at a temperature of approximately 240° to 270° C. and a pressure of approximately 50 to 130 bars.

17. Use of the molded body according to of claim 1, as interior automobile part, in particular as roof ceiling, as side paneling, packaging material, insulating material or as a furniture part.

* * * * *